Nov. 29, 1949   F. Y. SPEIGHT, JR   2,489,985
PROCESS FOR IMPREGNATING FIBROUS
MATERIALS AND PRODUCTS THEREOF
Filed Dec. 4, 1944   4 Sheets-Sheet 1
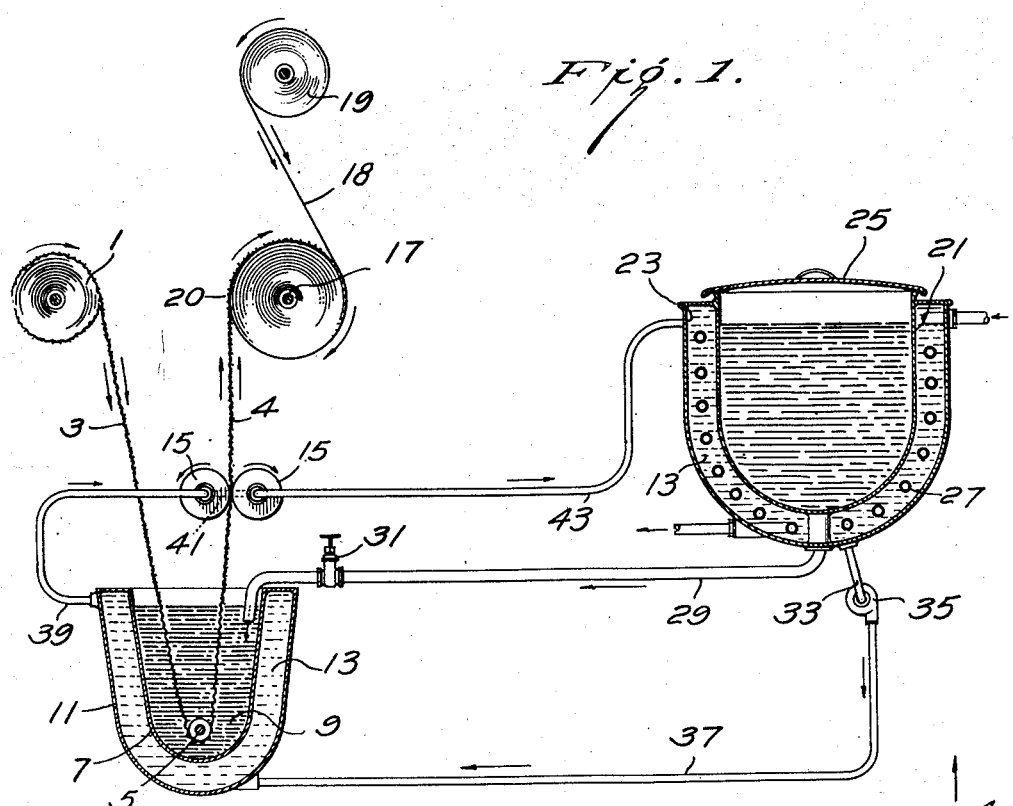
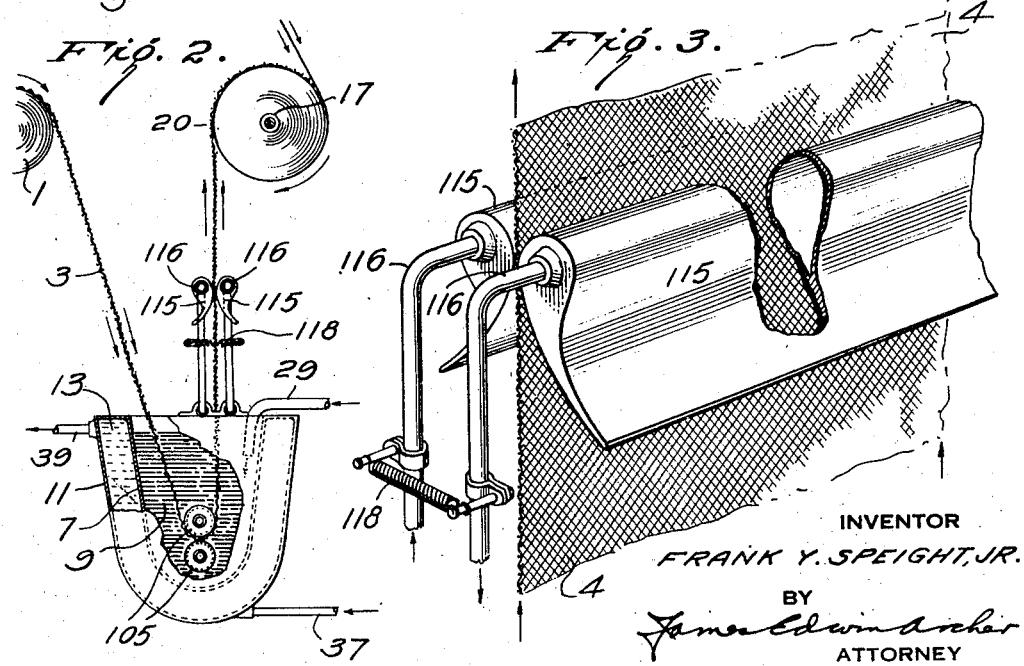
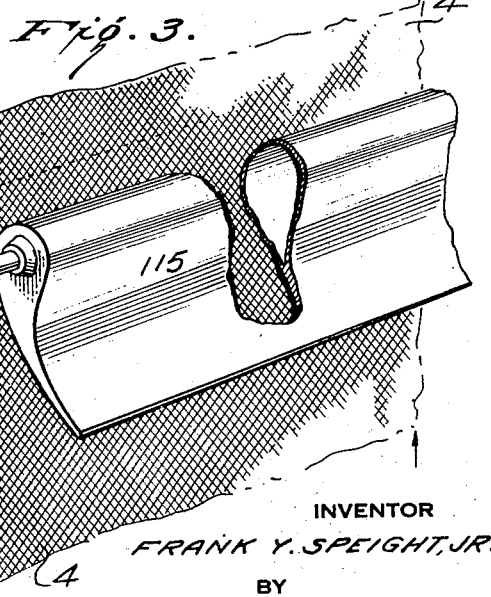
INVENTOR
FRANK Y. SPEIGHT, JR.
BY
James Edwin Archer
ATTORNEY

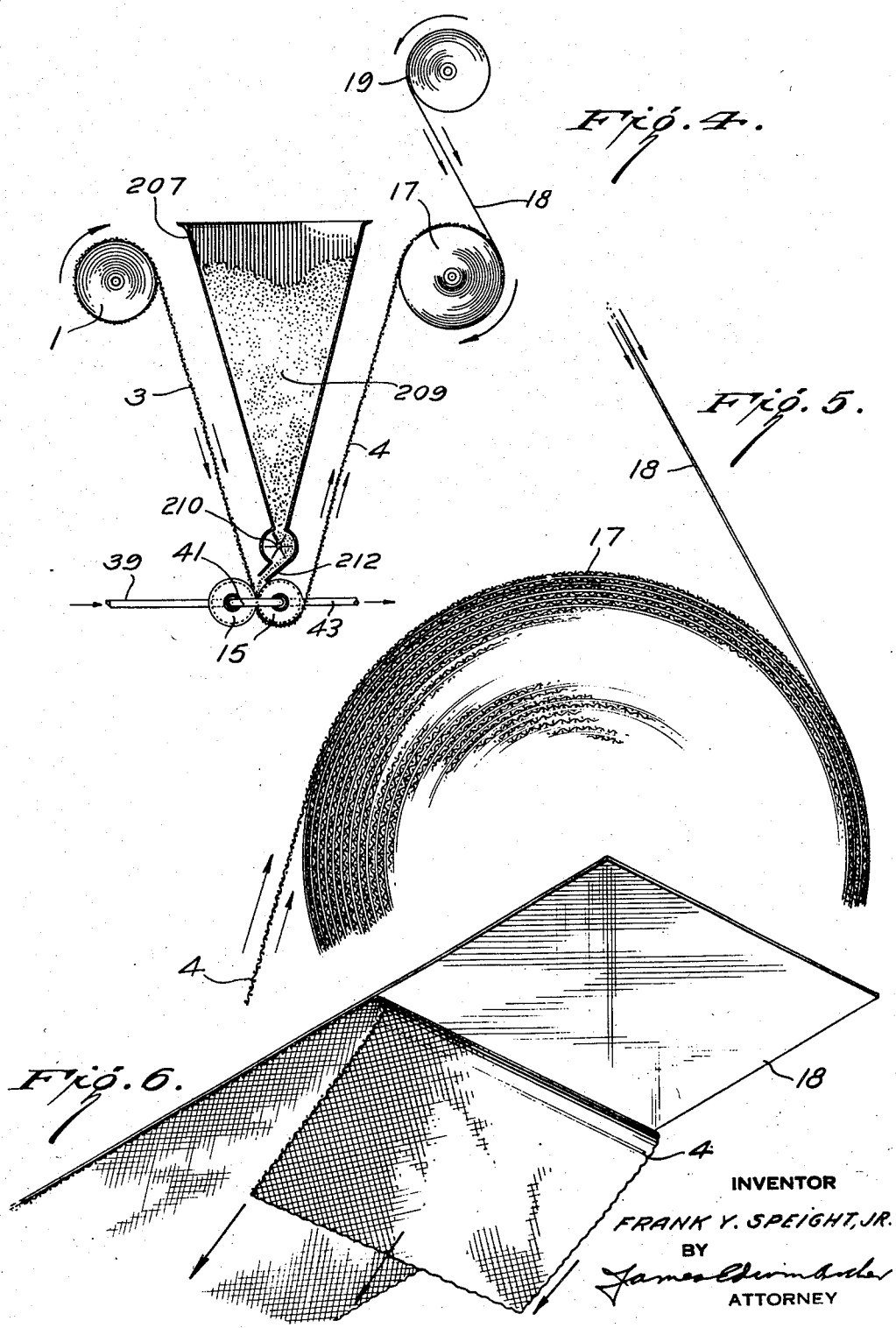

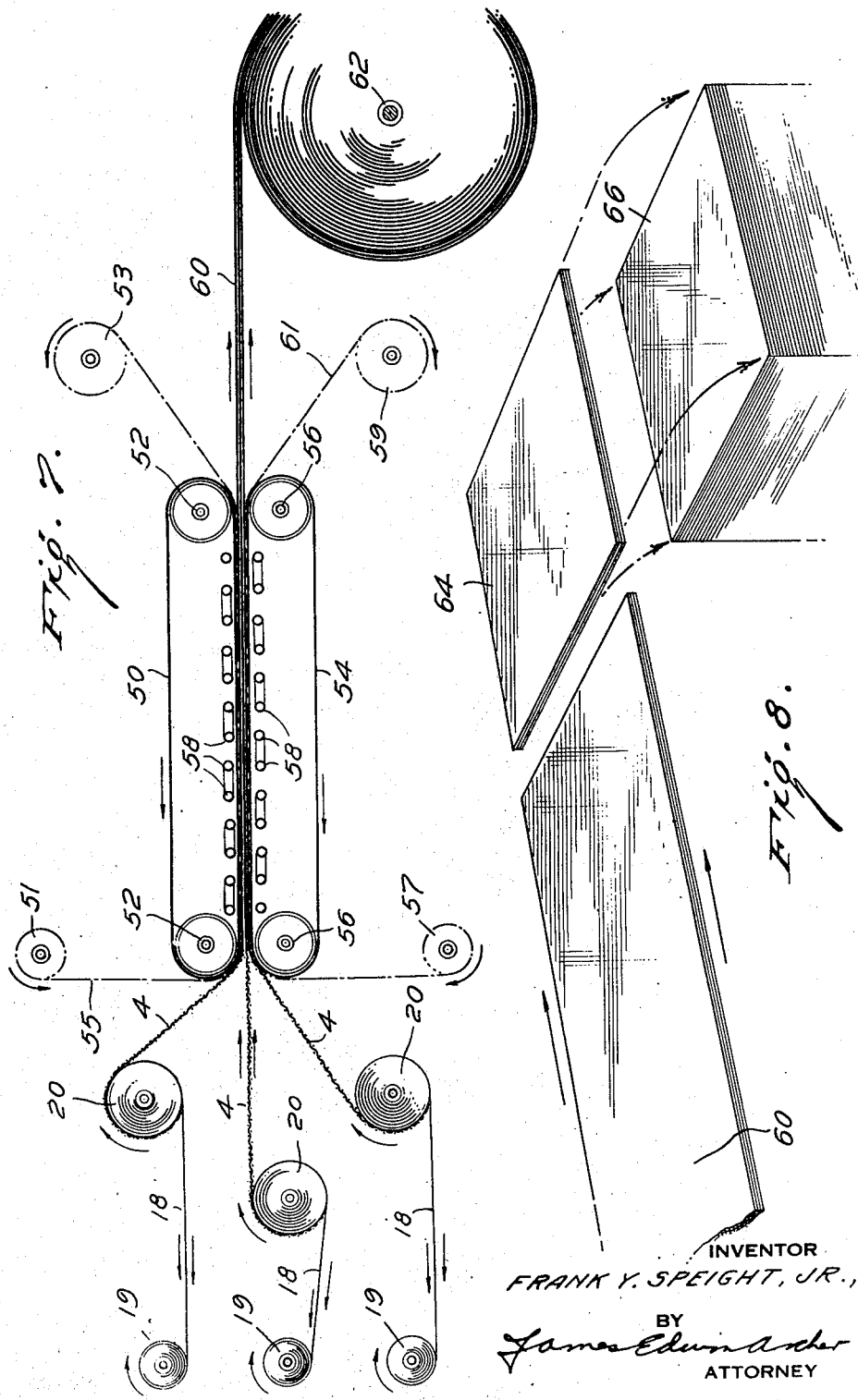

Nov. 29, 1949 F. Y. SPEIGHT, JR 2,489,985
PROCESS FOR IMPREGNATING FIBROUS
MATERIALS AND PRODUCTS THEREOF
Filed Dec. 4, 1944 4 Sheets-Sheet 4
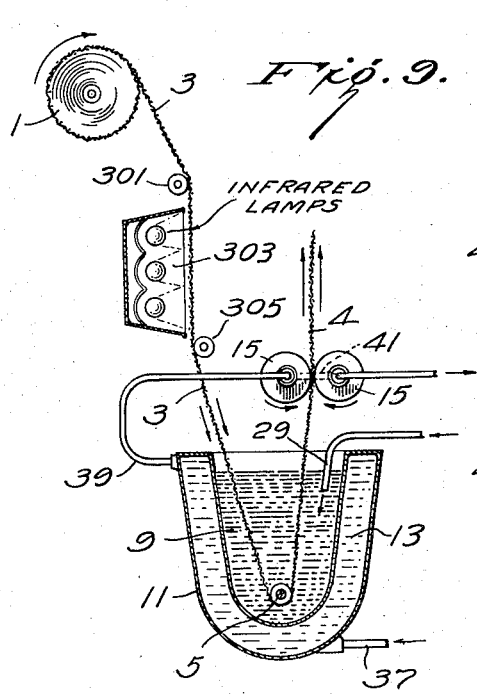
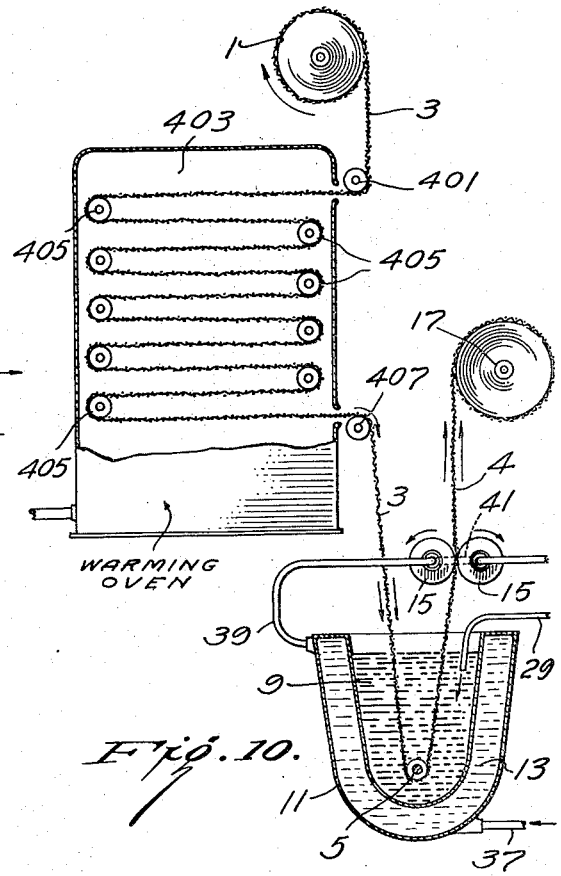
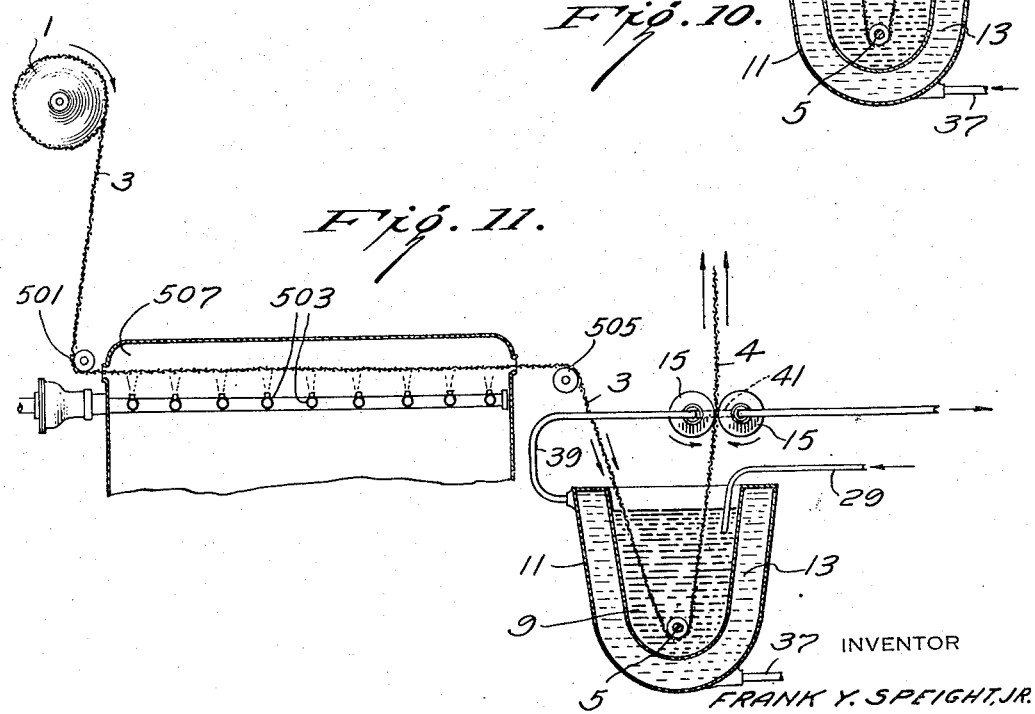
INVENTOR
FRANK Y. SPEIGHT, JR.
BY
ATTORNEY Patented Nov. 29, 1949

2,489,985

UNITED STATES PATENT OFFICE 2,489,985

PROCESS FOR IMPREGNATING FIBROUS MATERIALS AND PRODUCTS THEREOF

Frank Y. Speight, Jr., Greenwich, Conn., assignor to American Cyanamid Company, New York, N. Y., a corporation of Maine Application December 4, 1944, Serial No. 566,572

2 Claims. (Cl. 206—59)

This invention relates to a process for applying hot-melt resins or the like to fibrous materials and to a product or article of manufacture made thereby.

In the production of laminated materials bonded with substances which are normally solid at room temperature, it would be desirable to impregnate the fibrous material with the molten resin and to store this in the form of a roll of impregnated material until such time as it is desired to form a laminate, as by cutting the material into suitable lengths followed by the formation of an assembly thereof and this in turn followed by consolidation to form a laminate. This is desirable particularly with those bonding compositions which contain a volatile reactive component. If the material, after impregnation with a material containing a volatile reactive component, is permitted to cool by merely passing over a number of rolls or by festooning, a relatively large amount of the volatile reactive component of the bonding material may be lost and this is not only uneconomical, but may result in inferior laminates.

An object of the present invention is to provide a process for impregnating a fibrous material with a bonding material containing a volatile reactive component, which process minimizes the loss of said volatile reactive component.

Another object of this invention is to provide an apparatus for carrying out the process mentioned in the preceding paragraph.

Still another object of the present invention is to improve the impregnation of a fibrous material such as glass cloth and to provide a suitable apparatus for improving such impregnation of the fibrous material.

These and other objects are attained by applying a molten bonding material, containing a volatile reactive component, to a desired and substantially uniform amount, and winding the impregnated cloth on to a roll continuously along with a relatively impervious cover sheet, and if desired, prior to the impregnation of the fibrous material, heating the fibrous material such as glass cloth to remove substances which prevent good impregnation.

My invention will be more fully understood by reference to the accompanying drawings.

Figure 1 is an elevation partly in section showing one embodiment of my invention. Figure 2 is an elevation showing a modification of the apparatus illustrated in Figure 1. Figure 3 is a detail perspective view partly broken away to show the details of construction of one means of adjusting the proportions of bonding material which is retained in the fibrous material being impregnated.

Figure 4 is an elevation partly in section showing another embodiment of my apparatus.

Figure 5 is a fragmentary elevation view showing in detail the roll of impregnated material and cover sheet produced in accordance with my process and by means of the apparatus illustrated in Figures 1, 2 and 4.

Figure 6 is a perspective which shows a fibrous material which has been impregnated and rolled up in accordance with my process and which has been unrolled and the fibrous material partly separated from the cover sheet.

Figure 7 is a schematic elevation showing one method of utilizing the material produced in accordance with my invention, while Figure 8 is a schematic perspective showing a modification of the method of utilizing the impregnated material to produce laminated products in accordance with my invention.

Figure 9 is a schematic elevation partially sectioned and it illustrates a modification of my apparatus and process wherein the fibrous material is heated prior to impregnation. Figure 10 is a schematic elevation partially sectioned illustrating a modification of an apparatus of the type shown in Figure 9.

Figure 11 is a schematic elevation partially sectioned showing still another modification of an apparatus of the type shown in Figure 9.

Referring now to Figure 1, my apparatus is composed of a roll of fibrous material such as glass cloth 1, a roller 5 submerged in a bath of molten material 9 contained in a tank 7. Glass cloth 3 is drawn from roll 1 through the bath of molten material 9 under the roller 5 and thence out of the bath through a pair of squeeze rolls 15 and thence the impregnated material 6 is wound on a power-driven roller 17 concentrically and simultaneously with an impervious cover sheet 18 which is drawn from a roller 19. This cover sheet 18 may be cellophane, glassine paper, wax paper, Holland cloth, etc.

In order to maintain the molten material 9 in the fluid state, the vessel 7 is conveniently heated by means of a heat transfer medium such as water or oil 13 which is circulated through the jacket 11 surrounding the vessel 7. Furthermore, in order to supply additional quantities of molten material 9, as the molten material is used up, a vessel 21 having a jacket 23 and a cover 25 is provided. A heat transfer medium such as water 13 may be circulated through the jacket 23 and heated by means of steam coils 27. The vessel 21 is provided with an outlet conduit 29 which conduit contains a valve 31 and which conduit is adapted to feed molten material 9 into vessel 7. The heat transfer medium 13 which is circulated in the jackets 23 and 11 of the vessels 21 and 7, respectively, passes from jacket 23 through an outlet conduit 33 and is pumped by pump 35 through conduit 37 into the jacket 11 surrounding the vessel 7 and thence through an outlet conduit 39 into one of the rolls 15 and from there through conduit 41 back to the space between the jacket 23 and the vessel 21 where the fluid is reheated.

Figure 2 shows a modification of the apparatus illustrated in Figure 1 and differs in that the cloth 3 passes between a pair of squeeze rolls 105 which are submerged in the bath of molten material 9 and in that the impregnated material 4 passes between two presser feet 115 instead of between the squeeze rolls 15 illustrated in Figure 1. Presser feet 115 are heated in the same manner as rolls 15, the heat transfer medium 13 flowing from conduit 39 into one of the conduits 116 and out through the other conduit 116 into conduit 43. Pressure between presser feet 115 is maintained by means of a spring 118 and the tension on this spring may be adjusted to give the desired pressure.

A modification of my apparatus is shown in Figure 4 in which a dry, granular resin is applied to cloth or other fibrous material by melting on a heated pressure roll. In this embodiment of my invention, the fibrous material 3 is drawn from a roll 1 through a pair of squeeze rolls 15 which are heated by means of a heat transfer medium 13 flowing into one of the rolls 15, into the other roll 15 through conduit 41, and out through conduit 43. A granular resin 209 contained in a hopper 207 is fed at the desired rate by means of a star wheel 210 through the chute 212 onto one of the heated rolls 15 so that the resinous material is melted and squeezed onto the fabric 3 simultaneously. After impregnation of the fibrous material 3 the impregnated material 4 is wound on to the roll 17 simultaneously with an impervious cover sheet 18 which is drawn from a roll 19.

When the impregnated material 4 is to be used, the cover sheet 18 is stripped away from the former as illustrated in Figure 6 or as illustrated in Figure 7. In Figure 7, a continuous method of forming laminated materials from the impregnated material produced in accordance with this invention is illustrated. A plurality of rolls of impregnated material 20 are unwound and the impregnated material 4 is passed through a continuous laminating machine, comprising, for example, two traveling belts 50 and 54, which pass over a pair of rollers 52 and a pair of rollers 56, respectively. A cover sheet (shown in broken lines for clarity) 55 is drawn from roll 51 over the surface of belt 50 to prevent the impregnated fabric 4 from sticking to said belt. The cover sheet 55 is then rolled onto roll 53. Similarly, a cover sheet 61 is drawn from roll 57 over belt 54 and onto roll 59. The cover sheets 55 and 61 may be cellophane, Holland cloth, wax paper, glassine paper, etc., and may be reused. Rollers 52 and 56 are spaced apart the desired distance to apply a low pressure to the plurality of layers of impregnated material 4 passing between belts 50 and 54 so that the material will be bonded together. During the passage of the material through the laminating machine the impregnated material 4 is heated by means of steam coils 58 which causes the resinous material to cure and to thereby bond the layers of fibrous material 4 together to form a laminated material 60 which may be wound on a large roller 62 or which may be cut into suitable lengths 64 and stacked for shipping as shown at 66 in Figure 8. When the impregnated fibrous material 4 is drawn from roll 20 the impervious cover sheet 18 is simultaneously stripped therefrom and wound up on roll 19. Such rewound material may be used again in the process and apparatus illustrated in Figures 1-4.

Glass cloth and many other fibrous materials contain various substances which are contained in the fiber when the cloth is woven in order to facilitate the weaving operations and/or when the fiber is spun in order to facilitate the spinning operation. These substances often cause a non-uniform and unsatisfactory impregnation of the fibrous material and, in Figures 9-11, I have shown some modifications of my apparatus and process which are designed to overcome this difficulty. In Figure 9, the glass cloth 3 passes from the roll 1 over a roller 301 and in close proximity to a plurality of infra-red lamps 303 and thence under roller 305 down into the bath of molten material 9.

Referring to Figure 10, an embodiment of my invention showing the use of a warm oven to remove the objectionable materials contained in fibrous material to be impregnated is illustrated. Cloth 3 is drawn from roll 1 and passes down over roll 401 into a warm oven 403 and thence over a series of rolls 405 and finally out over a roller 407 and thence into the bath of molten material 9. The oven may be heated electrically, by a gas flame, or by means of steam coils.

In Figure 11 still another modification of my invention is illustrated, wherein the cloth 3 is drawn from roll 1 and passes over roller 501 into a housing 507. During the passage of the cloth 3 through the housing 507 it passes over a series of gas flames issuing from burners 503 and finally out over roller 505 and thence into the bath of molten material 9. If the cloth 3 is flammable it is fed through the housing 507 at such a rate that it will not be damaged sufficiently when passing over the burners to render it unsuitable for its intended purpose.

The resinous material 9 may be, for example, a copolymerizable composition containing an unsaturated substance containing the $CH_2=C<$ group having a boiling point of at least 60° C. and preferably having a boiling point of at least 100° C. together with a crystalline unsaturated alkyd resin. Examples of substances containing the $CH_2=C<$ group are styrene, p-methyl styrene, the dimethyl styrenes, the nuclear chlor substituted styrenes, the polyallyl esters including diallyl phthalate, diallyl maleate, diallyl succinate, diallyl sebacate, etc. The practice of the invention is particularly advantageous when the more volatile of the aforementioned substances are used. The crystalline, unsaturated alkyd resins which are suitable for use in such compositions are those which are prepared by reacting a completely symmetrical glycol with an alpha, beta unsaturated dicarboxylic acid having a transconfiguration. Examples of such resins are polyesters of ethylene glycol and fumaric acid, polyesters of neopentyl glycol and fumaric acid, polyesters of trimethylene glycol and fumaric acid, polyesters of octadecandiol and fumaric acid, etc. The copolymerizable compositions of the aforementioned type are disclosed in the patents of Edward L. Kropa, 2,409,633 and 2,443,736–41. The alkyd resins disclosed in these patents are prepared by reacting approximately equimolar proportions of glycol and dicarboxylic acid. The copolymerizable compositions disclosed in these patents contain a predominant proportion of alkyd resin.

The copolymerizable compositions which are employed for impregnating a fibrous material in accordance with my invention are normally solid at temperatures of 20°–30° C. but melt at temperatures between about 50° C. and about 100° C. or higher. Accordingly, a bath of molten material 9 or the solid material 209 should be heated to whatever temperature is required to maintain it in a molten condition but the temperature should preferably not be much higher inasmuch as the substance containing the $CH_2=C<$ group is volatile and will be partly lost if the temperature is too high. Furthermore, the time between that when the impregnated cloth leaves the bath of molten material 9 until it is wound up and covered by the impervious cover sheet 18, should be kept at a minimum in order to avoid the loss of the volatile material while the resin is still hot and while a large surface is exposed. This time should not be greater than about 20 seconds and is preferably below 5 seconds. If the distance between the wind-up roll 17 and the bath of molten material 9 (or the rolls 15 in the modification shown in Figure 4) be relatively short, the fabric being impregnated can be passed relatively slowly through the bath of molten material 9 without having the impregnated material exposed to the air for more than about 5 to 10 seconds. This will give sufficient time for a thorough impregnation of the fibrous material and at the same time keep the loss of the volatile component of the resinous mixture at a minimum.

While I have described my process and apparatus primarily in connection with the impregnation of glass cloth, other types of fibrous material may be impregnated in the same manner and with the same apparatus. Thus, for example, cloth or paper made of glass fibers, asbestos fibers, cellulose fibers, artificial fibers such as "nylon" and other synthetic polyamide fibers, cellulose acetate, regenerated cellulose, polyvinylidene chloride fibers such as those sold under the tradename "Saran," etc. The fibrous material may contain mixtures of any of the foregoing fibers or mixtures of any of those fibers with other fibers.

The heat treatment of the fibrous material illustrated in Figures 9–11 is especially useful in connection with the impregnation of glass cloth since glass cloth ordinarily contains certain chemical substances which are employed as lubricants in the spinning and weaving operations. The heat treatment carbonizes or volatilizes these substances and the resulting cloth is much more thoroughly and uniformly impregnated. This process may also be applied to other fibrous materials, but if the fibers are inflammable care must be taken to prevent undesirable damage to the fibers. In other words, the time of exposure to the heat treatment should generally be much less with inflammable material, and the temperature should be lower than that which can be used with the non-inflammable fibers.

The impregnation of the fibrous material is facilitated particularly because of the fact that air entrapped in the fabric is squeezed out if a plurality of rolls 105, shown in Figure 2, be used in the impregnating bath. If desired, cloth may be passed between three or more rolls in order to secure better and more uniform impregnation of the fibrous material.

The proportion of resin retained in the fabric after impregnation is adjusted by means of rolls 15 or by means of the presser feet 115 and these are heated in order to prevent the resin from solidifying thereon and in order to cause the excess resin which is removed to fall back into the vessel 7.

I claim:

1. An article of manufacture comprising a roll of alternate, spiral convolutions of fibrous material impregnated with a copolymerizable composition and a removable, non-adhering sheet of relatively impervious material, said copolymerizable composition containing a predominant proportion of an unsaturated alkyd resin solid at room temperature in admixture with a styrene, said resin having been prepared by reacting a completely symmetrical glycol with fumaric acid in approximately equimolar proportions, said sheet of impervious material substantially preventing loss by volatilization, of the styrene.

2. An article of manufacture according to claim 1 wherein the removable non-adhering sheet of relatively impervious material is cellophane.

FRANK Y. SPEIGHT, Jr.

REFERENCES CITED

The following references are of record in the file of this patent:

UNITED STATES PATENTS

| Number | Name | Date |
|---|---|---|
| 242,839 | Page | June 14, 1881 |
| 1,309,858 | Jones | July 15, 1919 |
| 1,444,061 | Butler | Feb. 6, 1923 |
| 1,469,875 | Beauregard | Oct. 9, 1923 |
| 1,611,400 | Andrews | Dec. 21, 1926 |
| 1,689,354 | MacKenna | Oct. 30, 1928 |
| 1,727,372 | Hennessy | Sept. 10, 1929 |
| 1,983,870 | Ostwald | Dec. 11, 1934 |
| 1,990,098 | Seymour | Feb. 5, 1935 |
| 1,990,701 | Knight | Feb. 12, 1935 |
| 2,057,167 | Sherman | Oct. 13, 1936 |
| 2,215,061 | Alt | Sept. 17, 1940 |
| 2,263,217 | Lillie | Nov. 18, 1941 |
| 2,267,470 | Kabela | Dec. 23, 1941 |
| 2,285,220 | Morrell | June 2, 1942 |
| 2,303,826 | DeBell | Dec. 1, 1942 |
| 2,341,219 | Jones | Feb. 8, 1944 |
| 2,429,688 | Hoover | Oct. 28, 1947 |
| 2,432,752 | Gray | Dec. 16, 1947 |